United States Patent
Längauer et al.

(10) Patent No.: US 12,123,567 B2
(45) Date of Patent: Oct. 22, 2024

(54) ILLUMINATION APPARATUS FOR A MOTOR VEHICLE HEADLAMP

(71) Applicant: ZKW Group GmbH, Wieselburg (AT)

(72) Inventors: Christoph Längauer, Lunz am See (AT); Philipp Elsler, Walpersdorf (AT); Hans-Jörg Riegler, Petzenkirchen (AT)

(73) Assignee: ZKW Group GmbH, Wieselburg (AT)

(*) Notice: Subject to any disclaimer, the term of this patent is extended or adjusted under 35 U.S.C. 154(b) by 0 days.

(21) Appl. No.: 17/918,424

(22) PCT Filed: Mar. 17, 2021

(86) PCT No.: PCT/EP2021/056843
§ 371 (c)(1),
(2) Date: Oct. 12, 2022

(87) PCT Pub. No.: WO2021/219287
PCT Pub. Date: Nov. 4, 2021

(65) Prior Publication Data
US 2023/0143512 A1 May 11, 2023

(30) Foreign Application Priority Data
Apr. 28, 2020 (EP) .................................. 20171812

(51) Int. Cl.
*F21S 41/675* (2018.01)
*F21S 41/32* (2018.01)
(Continued)

(52) U.S. Cl.
CPC .............. *F21S 41/675* (2018.01); *F21S 41/32* (2018.01); *F21S 41/39* (2018.01); *F21S 45/47* (2018.01); *F21S 45/49* (2018.01)

(58) Field of Classification Search
CPC .......... F21S 45/49; F21S 45/47; F21S 41/675; F21S 41/32; F21S 41/39
See application file for complete search history.

(56) References Cited

U.S. PATENT DOCUMENTS 7,612,440 B2 * 11/2009 Rancuret ............. H01L 23/4006
257/680
9,036,231 B2 * 5/2015 Zhou .................... G02B 26/101
359/199.2
(Continued)

FOREIGN PATENT DOCUMENTS

DE 102018110587 A1 11/2019

OTHER PUBLICATIONS

International Search Report for PCT/EP2021/056843, dated Apr. 19, 2021 (13 pages).
(Continued)

*Primary Examiner* — Arman B Fallahkhair
(74) *Attorney, Agent, or Firm* — Eversheds Sutherland (US) LLP

(57) ABSTRACT

A lighting device (1) for a motor vehicle headlamp, including an optoelectronic component (2), a cooling element (3), a circuit board (4), a stabilisation element (5) and a fastening element (6), wherein the stabilisation element (5) comprises an opening (5a) for enclosing the optoelectronic component (2), wherein at least two stabilisation arms (7) extend away from an edge of the opening (5a), which stabilisation arms (7) are equipped to act on the optoelectronic component (2), wherein the cooling element (3) contacts the optoelectronic component (2) on a side facing away from an active side of the optoelectronic component in such a manner that the same exerts a pressure on the optoelectronic component (2) acting in the direction of the active side of the optoelectronic component (2), wherein the at least two stabilisation arms (7) are designed resiliently and act on the active side of the optoelectronic component (2) in such a manner that the at least two stabilisation arms (7) counteract this pressure of the cooling element (3).

13 Claims, 2 Drawing Sheets

Figure 1:
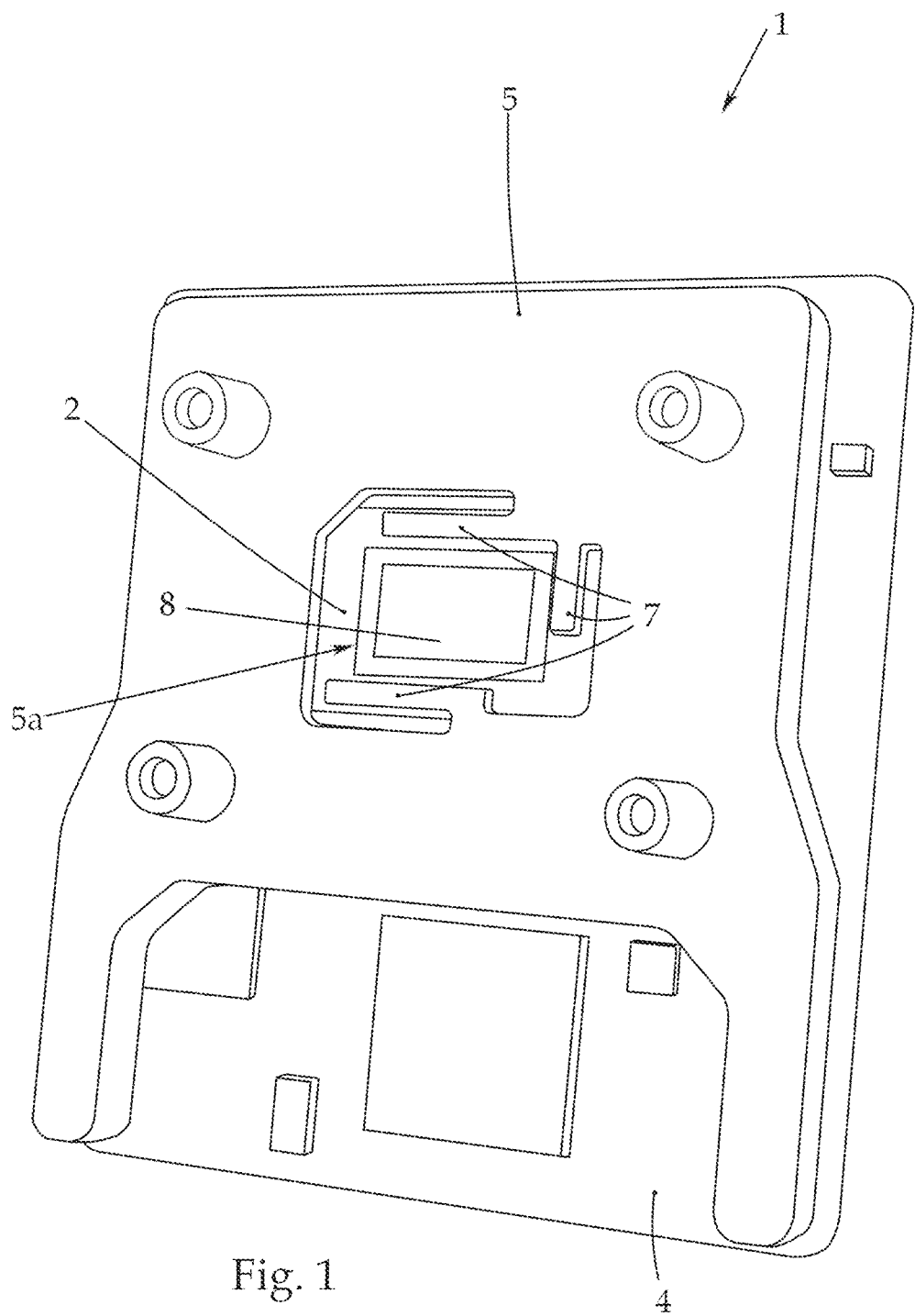

(51) Int. Cl.
    *F21S 41/39*    (2018.01)
    *F21S 45/47*    (2018.01)
    *F21S 45/49*    (2018.01)

(56) References Cited

U.S. PATENT DOCUMENTS

| | | | | |
|---|---|---|---|---|
| 10,082,665 | B2* | 9/2018 | Hou | G02B 7/181 |
| 10,429,024 | B2* | 10/2019 | Mayer | G02B 26/0833 |
| 10,488,007 | B2* | 11/2019 | Mayer | F21S 45/47 |
| 11,169,434 | B2* | 11/2021 | Tsai | G03B 21/005 |
| 11,697,369 | B2* | 7/2023 | Ahn | G01S 17/931 |
| | | | | 356/4.01 |
| 2016/0377252 | A1* | 12/2016 | Bhakta | F21V 23/003 |
| | | | | 362/520 |
| 2017/0255006 | A1 | 9/2017 | Naiwen et al. | |
| 2017/0272711 | A1* | 9/2017 | Mikawa | H04N 9/3144 |
| 2019/0056080 | A1 | 2/2019 | Mayer et al. | |
| 2019/0316752 | A1 | 10/2019 | Mayer et al. | |
| 2023/0341102 | A1* | 10/2023 | Ahn | F21S 41/148 |

OTHER PUBLICATIONS

Search Report for European Patent Application No. 20171812.9, dated Oct. 5, 2020 (8 pages).

* cited by examiner

ILLUMINATION APPARATUS FOR A MOTOR VEHICLE HEADLAMP

The invention relates to a lighting device for a motor vehicle headlamp, including an optoelectronic component, wherein the optoelectronic component comprises an active side, on which a controllable array of multiple micromirrors is arranged, which micromirrors are arranged in the form of a two-dimensional matrix with lines and columns and are pivotable independently of one another, a cooling element, which for cooling the optoelectronic component contacts the optoelectronic component on a side facing away from the active side, a circuit board, which is at least partially arranged between the cooling element and the optoelectronic component and is connected to the optoelectronic component for its electronic control, a stabilisation element, which is equipped in order to additionally stabilise the position of the optoelectronic component with respect to the circuit board, a fastening element, which is equipped in order to connect the stabilisation element and the cooling element.

Further, the invention relates to a motor vehicle headlamp having such a lighting device.

In the prior art, lighting devices for motor vehicles are known, which comprise an optoelectronic component. The optoelectronic component is usually fastened to a cooling element or a holder, wherein between the cooling element or the holder and the optoelectronic component spring elements are arranged in order to offset undesirable movements of the optoelectronic component. Disadvantageously, the structural complexity of the lighting devices is increased by the spring elements, which in turn leads to higher costs.

The object of the present invention consists in alleviating or removing the disadvantages of the prior art. The invention therefore sets itself the objective in particular to create a lighting device in which the fastening of the optoelectronic component is improved.

This object is solved through a lighting device having the features of claim 1. Preferred embodiments are stated in the dependent claims.

According to the invention, the stabilisation element comprises an opening for enclosing the optoelectronic component, wherein at least two stabilisation arms extend away from an edge of the opening which are equipped in the connected state to act, on the active side of the optoelectronic component, on the optoelectronic component, wherein in the connected state the cooling element contacts the optoelectronic component on the side facing away from the active side, in such a manner that the same exerts on the optoelectronic component a pressure acting in the direction of the active side of the optoelectronic component, wherein the at least two stabilisation arms are formed resiliently and act on the active side of the optoelectronic component in such a manner that the at least two stabilisation arms counteract this pressure of the cooling element.

Advantageously, no separate spring element is thus required between the cooling element and the optoelectronic component. No separate spring element between a holder for the optoelectronic component and the optoelectronic component is required either. The resilient action is generated by the stabilisation arms which are a part of the stabilisation element. The stabilisation arms and the stabilisation element are substantially one and the same component. The stabilisation arms can be designed resiliently in such a manner in order to counteract the pressure of the cooling element. Because of this, the optoelectronic component can be held stable and resilient at the same time. The connected state in this connection is to mean a state in which the stabilisation element is connected with the cooling element by means of the fastening element.

It can be provided that the stabilisation arms and the opening lie in the same plane. Because of this, a particularly compact design of the stabilisation element is possible. It can be provided that the opening is designed substantially rectangular. Since optoelectronic components are usually of a rectangular design, this results in the advantage that the optoelectronic component can ideally fit into the opening or be surrounded by the opening. Preferably, the opening has substantially the same ratio between length and width as the optoelectronic component, wherein the length and the width of the opening are at least 1%, preferably 2-5%, in particular 6-10% larger than the length and the width of the optoelectronic component.

It can be provided that a first stabilisation arm is oriented substantially parallel to a first side of the substantially rectangular opening and a second stabilisation arm is oriented substantially parallel to a second side of the substantially rectangular opening. Each stabilisation arm can comprise a first portion, which extends for example orthogonally away from the corresponding side of the opening and a second portion adjoining thereon, which runs parallel to that side of the opening from which the first portion extends. Wherein the first portion is preferentially shorter than the second portion. Preferentially, the stabilisation arms are substantially configured L-shaped, wherein the shorter L-leg extends orthogonally away from a side of the opening and the longer L-leg extends parallel to the same side of the opening. By way of the L-shaped configuration, a particularly good resilient action can be achieved.

It can be provided that a first stabilisation arm and a second stabilisation arm are arranged on opposite sides of the substantially rectangular opening. This results in the advantage that the optoelectronic component can be held particularly stable in the opening by the stabilisation arms. Preferentially, a stabilisation arm each is arranged on all four sides of the rectangular opening, which run in particular parallel to the corresponding side.

It can be provided that the length of a stabilisation arm preferentially corresponds to 25% to 75%, in particular 40% to 60%, particularly preferably 50% of the length of a side of the rectangle. Advantageously, a particularly good resilient action can be achieved because of this.

It can be provided that the lighting device includes a light source, which is equipped in order to radiate light onto the optoelectronic component.

It can be provided that the fastening element includes at least two screws with which in the connected state the stabilisation element is screwed to the cooling element. Advantageously, the stabilisation element can thus be particularly easily and cost-effectively connected to the cooling element.

It can be provided that the optoelectronic component on the active side comprises at least two holding regions, wherein a stabilisation arm each lies against each holding region. The holding region is preferentially free of micromirrors.

It can be provided that the stabilisation element is configured plate-shaped.

It can be provided that the stabilisation element is formed out of a heat-insulating material or comprises a heat-insulating coating. This results in the advantage that an undesirable heating of the micromirrors and/or of the control means of the micromirrors is reduced as a result of which the function of the micromirrors is not negatively influenced by heat.

According to the invention, a motor vehicle headlamp is provided which includes the lighting device.

Within the scope of this description, the terms "top", "bottom", "horizontal", "vertical" should be understood as information regarding the orientation when the lighting device is arranged in the normal usage position after it has been installed in a motor vehicle headlamp.

In the following, the invention is explained in more detail by way of a preferred exemplary embodiment but without being restricted to this. In the drawings it shows:

FIG. 1 a view of a lighting device according to the invention, and

Figure 2:
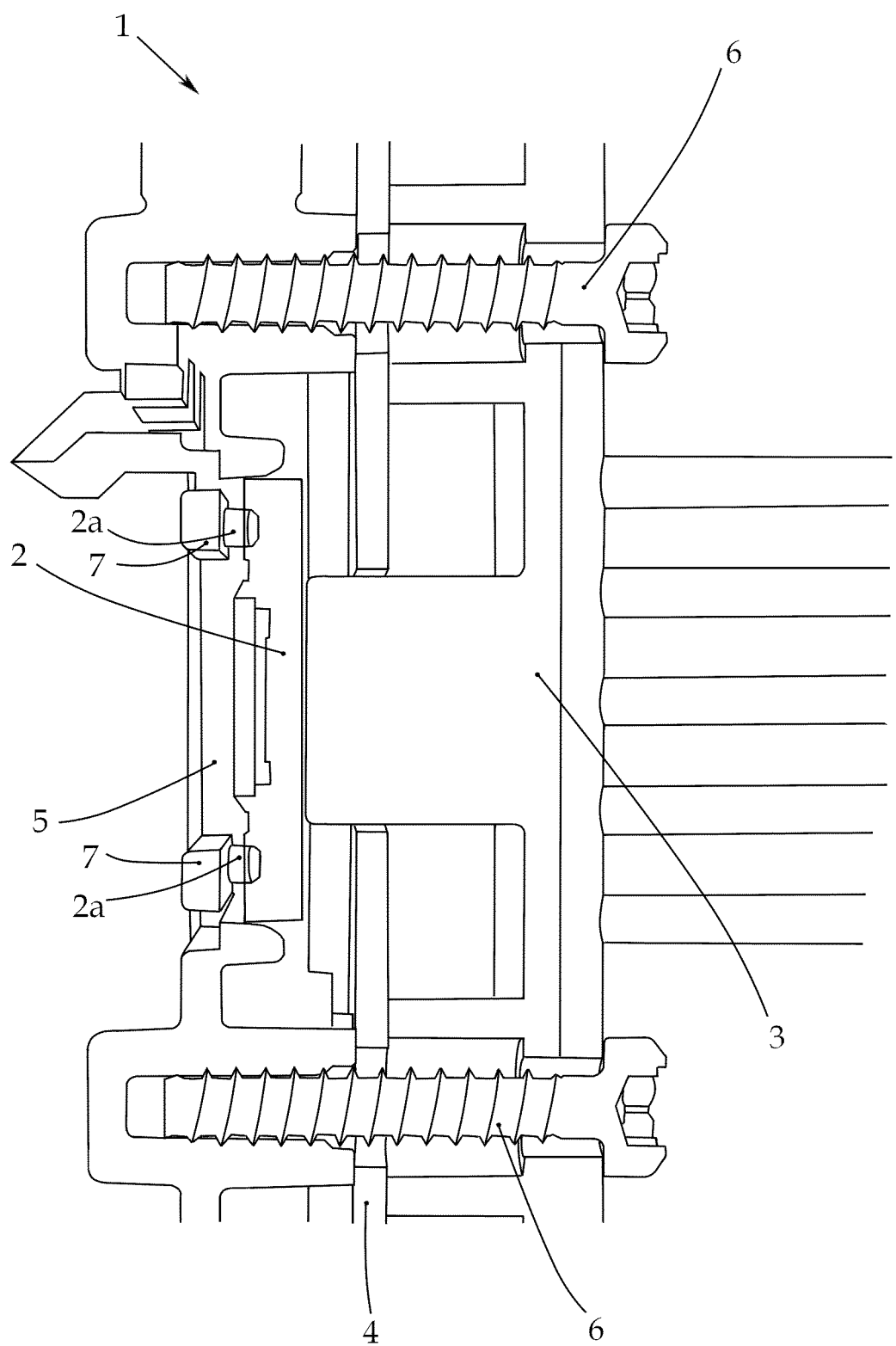

FIG. 2 a lateral view of the lighting device according to FIG. 1.

FIGS. 1 and 2 show two views of a lighting device 1 for a motor vehicle headlamp. The lighting device 1 includes an optoelectronic component 2 which has an active side, on which a controllable array of multiple micromirrors 8 is arranged. The micromirrors are arranged in the form of a two-dimensional matrix with lines and columns and are pivotable independently of one another. The lighting device 1 additionally includes a cooling element 3 which, for cooling the optoelectronic component 2, contacts the optoelectronic component 2 on a side facing away from the active side, a circuit board 4, which is arranged at least partially between the cooling element 3 and the optoelectronic component 2 and is connected to the optoelectronic component 2 for electronic control of the same, a stabilisation element 5, which is equipped in order to additionally stabilise the position of the optoelectronic component 2 with respect to the circuit board 4, and a fastening element 6, which is equipped in order to connect the stabilisation element 5 and the cooling element 3. The stabilisation element 5 is configured plate-shaped.

The stabilisation element 5 comprises an opening 5a for enclosing the optoelectronic component 2, wherein at least two stabilisation arms 7 extend away from an edge of the opening 5a. The opening 5a is substantially formed rectangular. The stabilisation arms 7 are equipped in order to act, in the connected state, on the active side of the optoelectronic component 2, on the optoelectronic component 2. The stabilisation arms 7 and the opening 5a lie in the same plane. In the connected state, the cooling element 3 contacts the optoelectronic component 2 on the side facing away from the active side in such a manner that the same exerts on the optoelectronic component 2 a pressure acting in the direction of the active side of the optoelectronic component 2. The at least two stabilisation arms 7 are formed so as to be resilient and act on the active side of the optoelectronic component 2, so that the at least two stabilisation arms 7 counteract this pressure of the cooling element 3.

The stabilisation arms 7 are each oriented parallel to a side of the rectangular opening 5a. The stabilisation arms 7 are arranged on opposite sides of the rectangular opening 5a.

In the exemplary embodiment shown in FIG. 1, the stabilisation element 5 includes three stabilisation arms 7, wherein a third stabilisation arm is arranged on a short side of the rectangular opening 5a. The length of the stabilisation arms 7 preferentially corresponds to 25 to 75%, in particular 40% to 60%, particularly preferably 50% of the length of a side of the rectangle.

As is evident in FIG. 2, the fastening element 6 includes at least two screws with which in the connected state the stabilisation element 5 is screwed to the cooling element 3.

On the active side, the optoelectronic component 2 comprises at least two holding regions 2a, wherein a stabilisation arm 7 each lies against each holding region 2a. In corresponding places, the circuit board 4 comprises passage openings through which the fastening element 6 passes in the connected state. The fastening element 6 engages in a corresponding engagement opening in the stabilisation element 5 in order to achieve a firm connection between the stabilisation element 5 and the cooling element 3, wherein the circuit board 4 and the optoelectronic component 2 are substantially arranged between the stabilisation element 5 and the cooling element 3. The layer structure is evident in FIG. 2.

The invention claimed is:

1. A lighting device (1) for a motor vehicle headlamp, the lighting device comprising:
    an optoelectronic component (2), wherein the optoelectronic component (2) has an active side, on which a controllable array of multiple micromirrors is arranged, which micromirrors are arranged in the form of a two-dimensional matrix with lines and columns and are pivotable independently of one another;
    a cooling element (3), which contacts the optoelectronic component (2) on a side facing away from the active side for cooling the optoelectronic component (2);
    a circuit board (4), which is at least partially arranged between the cooling element (3) and the optoelectronic component (2) and for electronically controlling the optoelectronic component (2) is connected to the same;
    a stabilisation element (5), which is equipped in order to additionally stabilise the position of the optoelectronic component (2) with respect to the circuit board (4);
    a fastening element (6), which is equipped in order to connect the stabilisation element (5) and the cooling element (4),
    wherein the stabilisation element (5) comprises an opening (5a) for enclosing the optoelectronic component (2), wherein at least two stabilisation arms (7) extend away from an edge of the opening (5a), which stabilisation arms (7) are equipped to act, in the connected state, on the active side of the optoelectronic component (2), on the optoelectronic component (2), wherein in the connected state the cooling element (3) contacts the optoelectronic component (2) on the side facing away from the active side in such a manner that the same exerts a pressure on the optoelectronic component (2) acting in the direction of the active side of the optoelectronic component (2), wherein the at least two stabilisation arms (7) are configured to resiliently act on the active side of the optoelectronic component (2) in such a manner that the at least two stabilisation arms (7) counteract this pressure of the cooling element (3),
    wherein the stabilisation arms (7) and the opening (5a) lie in the same plane.

2. The lighting device (1) according to claim 1, wherein the opening (5a) is substantially rectangular.

3. The lighting device (1) according to claim 2, wherein the length of a stabilisation arm (7) corresponds to 25% to 75% of the length of a side of the rectangle (5a).

4. The lighting device (1) according to claim 3, wherein the length of a stabilisation arm (7) corresponds to 40% to 60% of the length of a side of the rectangle (5a).

5. The lighting device (1) according to claim 3, wherein the length of a stabilisation arm (7) corresponds to 50% of the length of a side of the rectangle (5a).

6. The lighting device (1) according to claim 2, wherein a first stabilisation arm (7) is oriented substantially parallel to a first side of the substantially rectangular opening (5a) and a second stabilisation arm (7) is substantially oriented parallel to a second side of the substantially rectangular opening (5a).

7. The lighting device (1) according to claim 2, wherein a first stabilisation arm (7) and a second stabilisation arm (7) are arranged on opposite sides of the substantially rectangular opening (5a).

8. The lighting device (1) according to claim 1, including a light source which is equipped to radiate light onto the optoelectronic component (2).

9. The lighting device (1) according to claim 1, wherein the fastening element (6) includes at least two screws with which in the connected state the stabilisation element (5) is screwed to the cooling element (3).

10. The lighting device (1) according to claim 1, wherein the optoelectronic component (2) on the active side comprises at least two holding regions (2a) wherein a stabilisation arm (7) each lies against each holding region (2a).

11. The lighting device (1) according to claim 1, wherein the stabilisation element (5) is configured plate-shaped.

12. The lighting device (1) according to claim 1, wherein the stabilisation element (5) is formed out of a heat-insulating material or comprises a heat-insulating coating.

13. A motor vehicle headlamp including a lighting device (1) according to claim 1.

* * * * *